United States Patent
Haavisto

(10) Patent No.: US 6,675,727 B1
(45) Date of Patent: Jan. 13, 2004

(54) METHOD FOR FEEDING SOLID MATERIAL INTO A REACTION SPACE, WHEREIN SOLID MATERIAL IS CONSUMED IN THE REACTION

(75) Inventor: Ilkka Haavisto, Hameenlinna (FI)

(73) Assignee: Pyrox Oy, Hameenlinna (FI)

( * ) Notice: Subject to any disclaimer, the term of this patent is extended or adjusted under 35 U.S.C. 154(b) by 0 days.

(21) Appl. No.: 10/069,296

(22) PCT Filed: Aug. 24, 2000

(86) PCT No.: PCT/FI00/00718
§ 371 (c)(1),
(2), (4) Date: May 9, 2002

(87) PCT Pub. No.: WO01/14796
PCT Pub. Date: Mar. 1, 2001

(30) Foreign Application Priority Data

Aug. 24, 1999 (FI) .................................................. 99 1799

(51) Int. Cl.⁷ .................................................. F23B 7/00
(52) U.S. Cl. .................. 110/341; 110/186; 110/101 R; 110/101 CF
(58) Field of Search .............................. 110/322, 101 R, 110/101 C, 101 CF, 101 CB, 101 CC, 101 CD, 341, 342, 348, 185, 186, 189; 423/497; 406/30

(56) References Cited

U.S. PATENT DOCUMENTS

| 2,424,755 A | * | 7/1947 | Johnson ......................... 110/32 |
| 3,921,545 A | | 11/1975 | Ruegsegger |
| 4,111,665 A | | 9/1978 | Pasternak et al. |
| 4,466,809 A | | 8/1984 | Kissel et al. |
| 4,565,184 A | | 1/1986 | Collins et al. |
| 4,594,028 A | * | 6/1986 | Ulveling ......................... 406/30 |
| 4,856,438 A | | 8/1989 | Peugh |
| 5,285,735 A | * | 2/1994 | Motoi et al. ............ 110/101 CB |

FOREIGN PATENT DOCUMENTS

WO    WO 9119683    12/1991

* cited by examiner

Primary Examiner—K. B. Rinehart
(74) Attorney, Agent, or Firm—Young & Thompson

(57) ABSTRACT

A method for feeding solids (8) into a reaction space (2), which solids are prevented from leaving in the form of a solid substance. The method includes feeding solids such that the pressure (F1) they exert on the walls of the reaction space (2) or the walls of the feed duct (9) leading to the reaction space is constant, while the reaction space is being supplied with a substance (6) which reacts with the solids and results in the conversion of the solids into non-solid reaction products. The counter-pressure (F) exerted by the walls of the reaction space or the walls of the feed duct leading to the reaction space then decreases and solids are impelled into the reaction space at the same rate as they are consumed during the reaction.

9 Claims, 1 Drawing Sheet

METHOD FOR FEEDING SOLID MATERIAL INTO A REACTION SPACE, WHEREIN SOLID MATERIAL IS CONSUMED IN THE REACTION

BACKGROUND OF THE INVENTION

The invention relates to a method as defined in the preamble of claim 1 for feeding solids into a reaction space, the solids being consumed during the reaction that takes place in the reaction space.

DESCRIPTION OF THE RELATED ART

In processes where solid matters are transformed into non-solid matters during the reaction, the methods for feeding solid matters are invariably based on the use of sensors for measuring various variables. The sensors are used for measuring either process parameters or any variable consumed in the process, and the feed of solid matters into the reaction is controlled on the basis of the signals emitted by the sensor. Such variables to be measured usually comprise for instance the solids content or product content, the process temperature or the surface level or weight of the solids.

However, control methods based on sensors involve a number of drawbacks. Control methods based on the use of sensors always involve a certain delay, which depends on the process and the sensor in question and causes fluctuation in the process control. Thus, for instance, the delay of oxygen sensors for observing flue gases is in the range from tens of seconds to about one minute, and then there will continually be a small lag between the process steps and the process control. The practical inconvenience caused by this fluctuation depends on the nature of the process to be controlled. In chemical processes, the use of sensors tends to create problems in the dissolution processes of solid matters, i.a. salt, and the combustion processes of solid fuels. In such processes, even small lags between the solids feed rate and the reaction rate of the solid matter consumed in the process result in fluctuating process parameters, such as for instance the solution concentration, the process efficiency or emissions. Specifically in the case of the combustion process of solid fuels, the entire process is apt to fluctuate, because fuels react in different ways at various stages of the heating of the fuel. The problem is particularly accentuated in the gasification of solid fuels in a solid bed process, because fuel consumption is impossible to measure in practice by any other means than sensors based on the physical shape of the fuel layer. Since solid fuels retain their shape for some time regardless of the reactions of the substance, the use of sensors based on the physical shape, such as the surface, tends to entail clear lags between the fuel feed rate and the reaction rate, resulting in fluctuations in the entire gasification process. When gas is used as an engine fuel, this may in the extreme lead to the engine stalling if the heat content of the gas varies too much.

SUMMARY OF THE INVENTION

The object of the invention is to eliminate the drawbacks of conventional methods, in which solid matters are fed into a reactor, where these solids are transformed into non-solid substances during the reaction. In such processes, the lags between the feed rate and the reaction rate of solids impair the outcome of the process in most cases, and for this reason the chief objective of the invention is to eliminate fluctuation by providing a method for feeding solid matters, in which the solids feed rate is permanently essentially equal to the solids reaction rate in the reactor.

The objective mentioned above is achieved with the method of claim 1 and the apparatus of claim 7 used in this method.

In the method of the invention, solids are fed into a reaction space, which the solids are prevented from leaving in the form of solid substances. Solids are fed into the reaction space under constant feed pressure, i.e. with constant torque, and then the feed will exert constant pressure on the walls of the reaction space or the walls of the feed duct leading to the reaction space. At the same time, the reaction space is supplied with a substance reacting with the solids and resulting in the conversion of the solids into a non-solid reaction product. During the reaction, the counter-pressure exerted by the walls of the reaction space or the walls of the feed duct leading to the reaction space on the solids decreases below the feed pressure due to the consumption of solids, and consequently, solids are impelled into the reaction space at the same rate as they are being consumed during the reaction. On the one hand, the apparatus of the invention comprises means for feeding solids and also the substance reacting with the solids into the reaction space, and the reaction space comprises means for preventing the solids from leaving the space as solid substances. The feed apparatus, on the other hand, comprises a feed device and means for maintaining the feed pressure of the feed device constant.

The method of the invention and the apparatus used in it allow fluctuation to be eliminated in processes where solid matters are fed into the reactor, where the solids are converted into non-solid reaction products. This is achieved with the method for feeding solids of the invention, where solids are fed into the reaction space consistently at the same rate as they are being consumed in the reaction. The feed method is based on the fact that, as the solids react and are thus consumed, the counter-pressure exerted by the walls of the reaction space or the walls of the feed duct on the solids drops, the permanently constant feed pressure thus exceeding the counter-pressure, so that solids are automatically impelled into the reaction space. Having a constant torque, the feed device thus keeps the constant amount of reacting solids in the reaction space. Whether a high or a low reaction rate, the contact with the solids and the substances reacting with them will remain constant, and no fluctuation in the lag between the solids feed rate and the reaction rate, which would impair the reaction efficiency, will occur.

The solids feed is preferably performed by means of a hydraulic device utilising the pressure of a hydraulic liquid, such as a hydraulic motor or a hydraulic cylinder. The method is particularly well applicable to the control of a gasification process, in which the solid substance to be burnt is a solid fuel, such as for instance biomass, and the substance reacting with it is air or oxygen.

BRIEF DESCRIPTION OF THE DRAWINGS

The invention will be described more in detail below with reference to the accompanying figure.

DESCRIPTION OF THE PREFERRED EMBODIMENT

Figure 1:
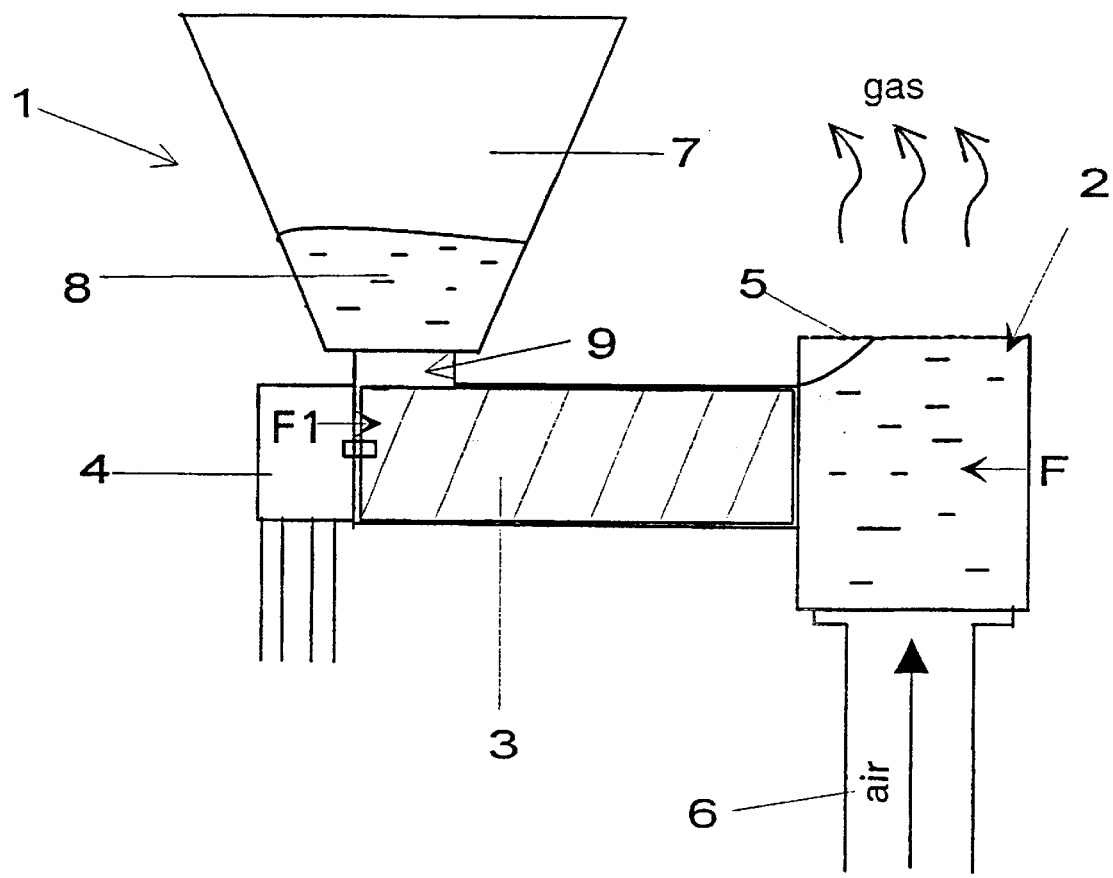
FIG. 1 is a schematic cross-section of an apparatus used in the combustion process of a solid fuel.

FIG. 1 shows how the combustion process of a solid fuel is implemented using the feed method of the invention. In the illustrated apparatus 1 for processing solid fuels, the solid fuel 8 drops from the solids silo 7 into the feed duct 9, from where it is taken with a screw conveyor 3 to the combustion chamber 2. The reaction space, i.e. in this case, the combustion chamber, is otherwise closed, except for minor apertures 5 in its upper part, through which flue gases generated in the combustion reaction can escape. These apertures should then be small enough to prevent fuel from flowing out. Fuel is introduced into the combustion chamber by means of a screw conveyor 3. The screw conveyor is driven by a hydraulic motor 4 that produces a constant torque F1. The combustion chamber is supplied with biomass via feed duct 9 by means of the screw conveyor, and with air 6, respectively, via the air feed duct, allowing the solids to escape from the combustion chamber only in the form of flue gases through the apertures 5. During combustion, the solid fuel 8 is gasified and the counter-pressure F exerted by the chamber walls on the fuel drops below the torque F1 of the screw conveyor, and then the screw conveyor feeds additional fuel into the combustion chamber.

The combustion process of solid fuel has been described above. A similar method is applicable to reactions between solids and the liquid phase, for instance to the dissolution of road salt. The reaction space is supplied with water and calcium chloride.

As the calcium chloride crystals are dissolved into water in the reaction space, the feed apparatus impels additional salt into the reaction chamber, and there will be no variation in the concentration of the produced solution caused by shortage of salt.

Only a number of embodiments of the invention have been described above, however, it is obvious to those skilled in the art that the invention can be implemented using several other optional methods and apparatus set-ups within the scope of protection of the claims. Thus, screw conveyance can be replaced for instance with a piston, which is actuated with a hydraulic cylinder.

In their most straightforward embodiment, the means for preventing the solids from leaving the reaction space may be based on the poor viscosity of the fuel as in the embodiment of example 1. The solids may be prevented from leaving the reaction space by other means as well, such as a mesh structure provided on the walls of the reaction space.

The pressure generated by the solids may be exerted on the walls of the reaction space, as in the example of FIG. 1. Optionally, a constriction may be provided in the feed duct in the vicinity of the mouth leading to the reaction space, the solids passing through the constriction into the reaction space only at the same rate at which it being consumed during the reaction.

What is claimed is:

1. A method for feeding solids (8) into a reaction space (2), wherein the reaction space, which the solids are prevented from leaving as solid substances, is supplied with a substance (6) which reacts with the solids and results in conversion of the solids into non-solid reaction products, characterized in that solids (8) are fed into the reaction space under constant feed pressure, so that the feed will exert constant pressure (F1) on the walls of the reaction space, when the solids are fed into the reaction space, the walls of the reaction space exert a counter pressure (F) on the solids in the reaction space, the constant feed pressure of the solids is maintained by a feed device (3) with a constant torque or/and constant hydraulic pressure during the reaction and when the constant pressure (F1) and the constant feed pressure of the solids exceeds the counter-pressure (F) during the reaction, solids are automatically impelled into the reaction space, at the same rate as they are consumed during the reaction.

2. A method as defined in claim 1, characterised in that solids (2) are impelled in the reaction space without measuring variables or other process parameters indicating the rate of solid matter consumed, as for instance the solids content or the product content, the process temperature or the surface level, the weight or the oxygen level of solids, the physical shape of the fuel layer, the solids content or the product content.

3. A method as defined in claim 1, characterised in that the feed device (3) is a piston or screw means and that the feed pressure (F1) the feed device generates is maintained constant with a hydraulic device.

4. A method as defined in claim 1, characterised in that the constant feed pressure of solids (8) is attained by feeding solids by means of a device (4) actuated under the pressure of a hydraulic liquid.

5. A method as defined in claim 1, characterised in that the substance (6) reacting with the solids is a gas or a liquid.

6. A method as defined in claim 4, characterised in that the solids (8) are a solid fuel and the substance (6) reacting with the solids is air, aqueous vapour or oxygen.

7. A method as defined in claim 5, characterised in that the solids (8) are a salt and the substance (6) reacting with the solids is a gas or a liquid.

8. A solids processing apparatus (1), comprising means for feeding solids into the reaction space (2), the solids (8) being consumed in the reaction that takes place in the reaction space, and means for feeding a substance (6) reacting with the solids into the same reaction space, the feed apparatus having means for feeding solids into the reaction space comprising a feed device (3), and the reaction space (2) comprises means (5) for preventing the solids from leaving the reaction space in the form of a solid substance characterised in that feed pressure is maintained constant with a feed device (3) utilising the pressure of a hydraulic device and/or device with a constant torque and in that, there are no sensors measuring variables or other process parameters indicating the rate of solid matter consumed, as for instance the solids content or the product content, the process temperature or the surface level, or the weight or oxygen level of the solids, the physical shape of the fuel layer, the solids content or the product content.

9. An apparatus as defined in claim 8, characterised in that the feed device (3) is a piston or screw and that the feed pressure (F1) is maintained constant with a feed device (3) utilising a hydraulic cylinder.

* * * * *